Figure 12:
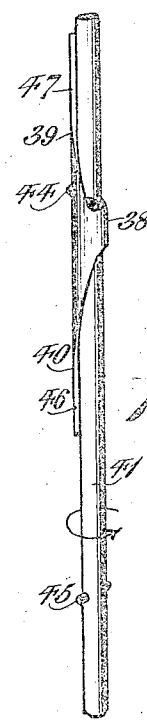

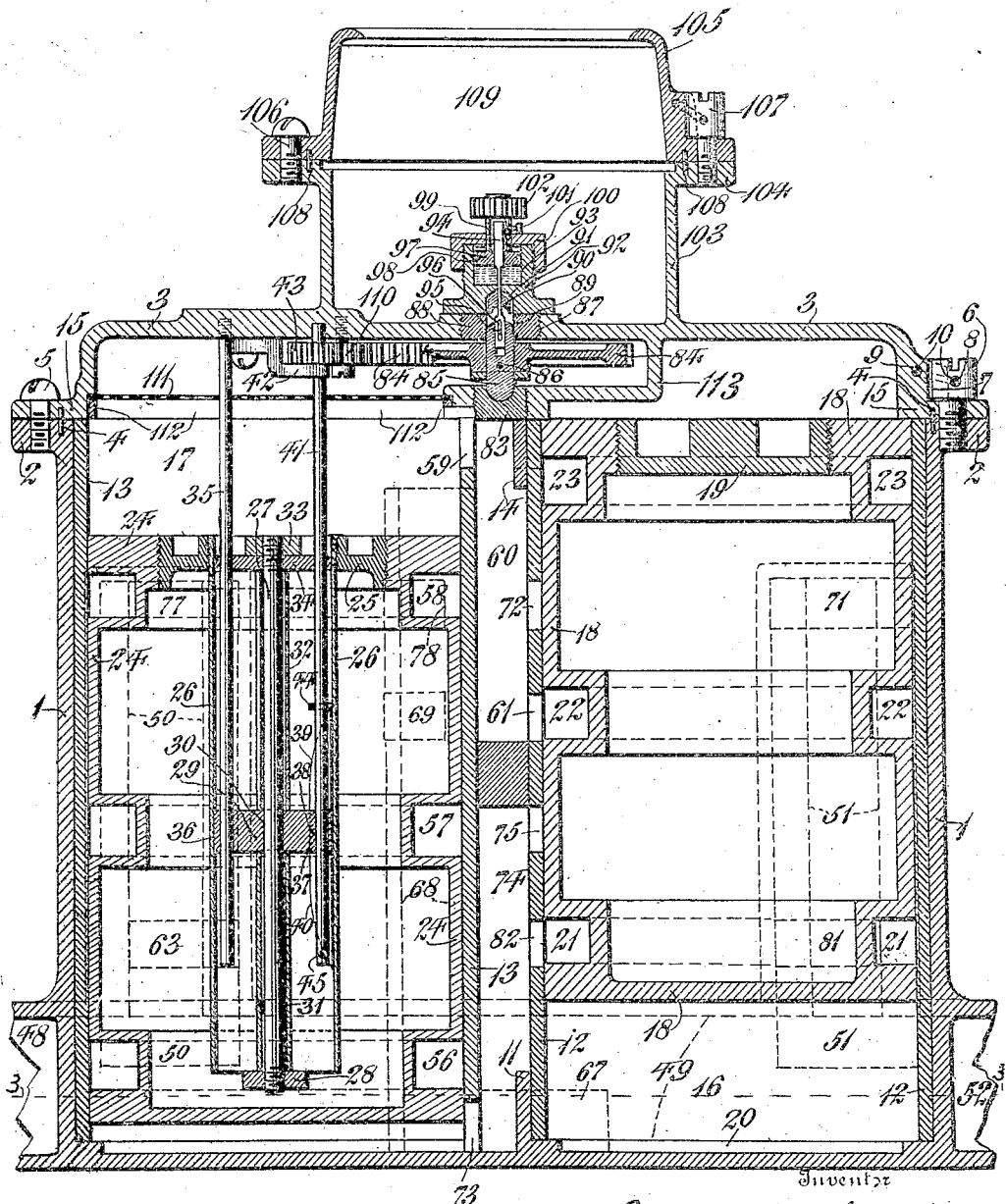

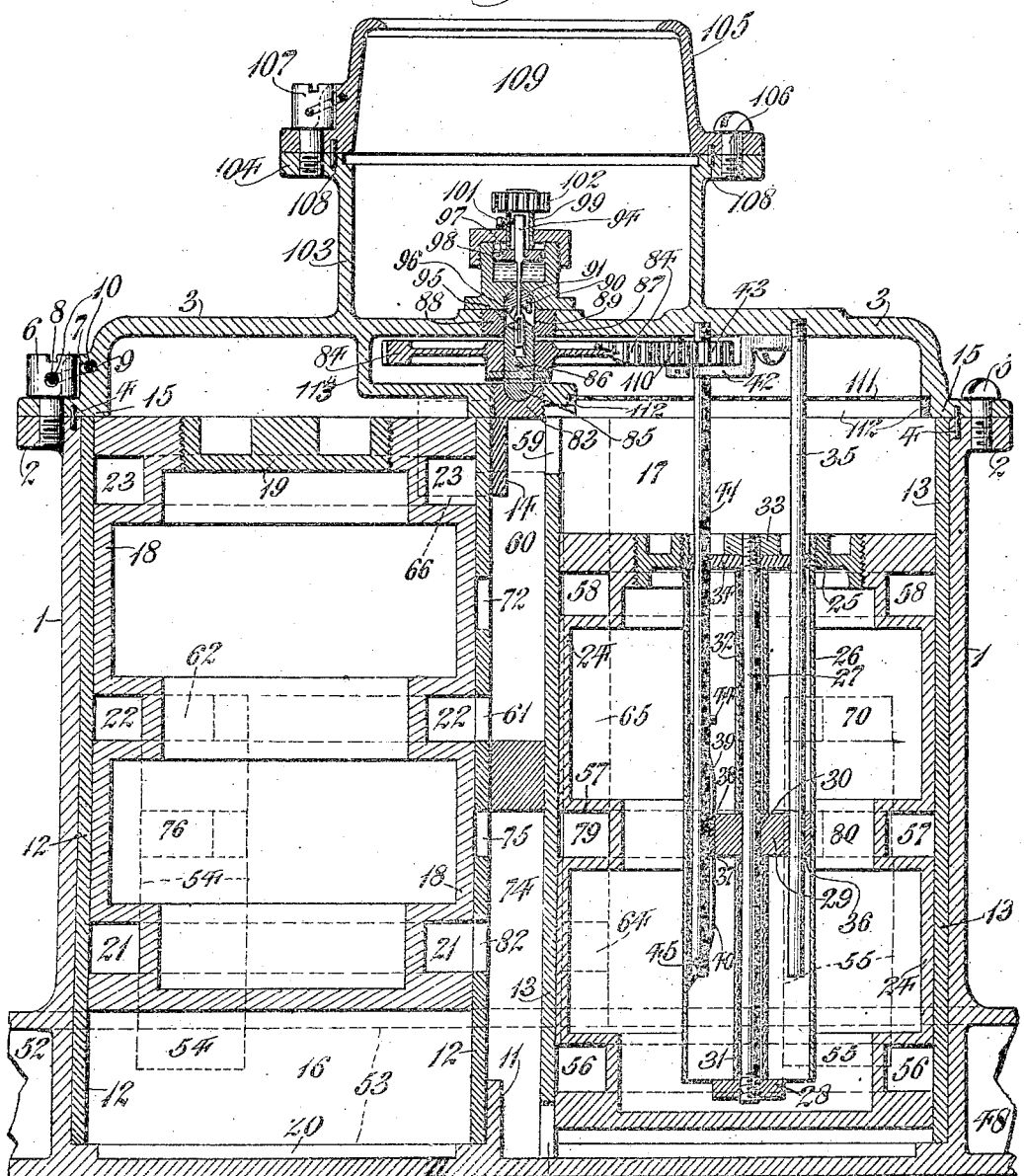

No. 862,584.
PATENTED AUG. 6, 1907.
W. S. POLLARD.
WATER METER.
APPLICATION FILED APR. 5, 1906.
5 SHEETS—SHEET 3.
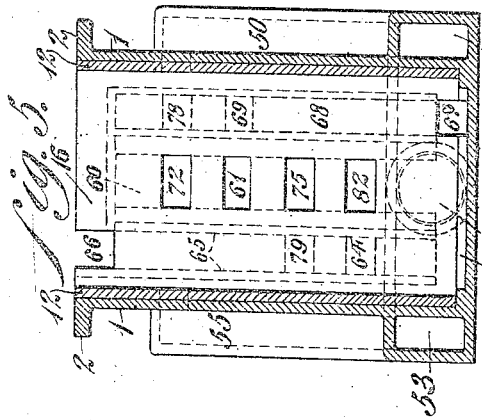
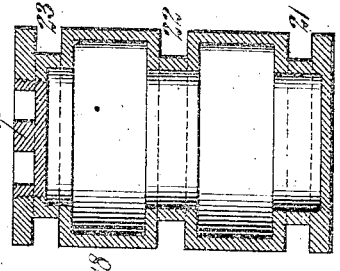
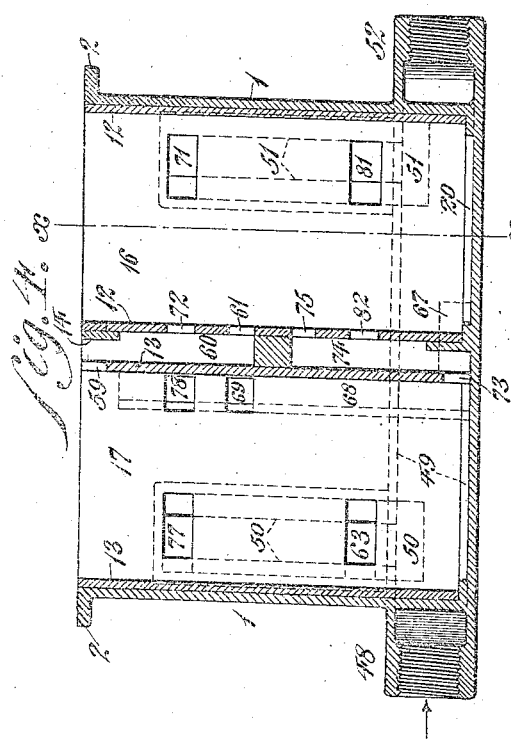
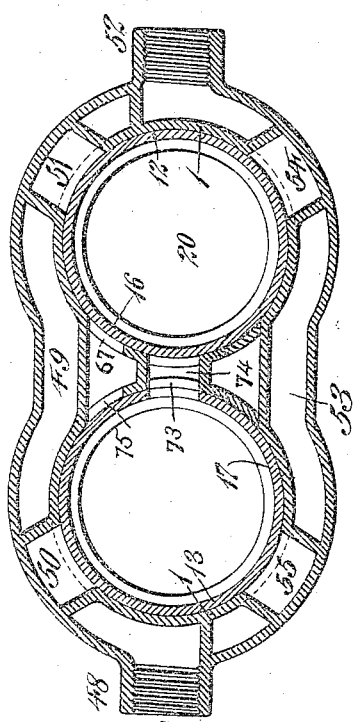

No. 862,584. PATENTED AUG. 6, 1907.
W. S. POLLARD.
WATER METER.
APPLICATION FILED APR. 5, 1906.
5 SHEETS—SHEET 4.
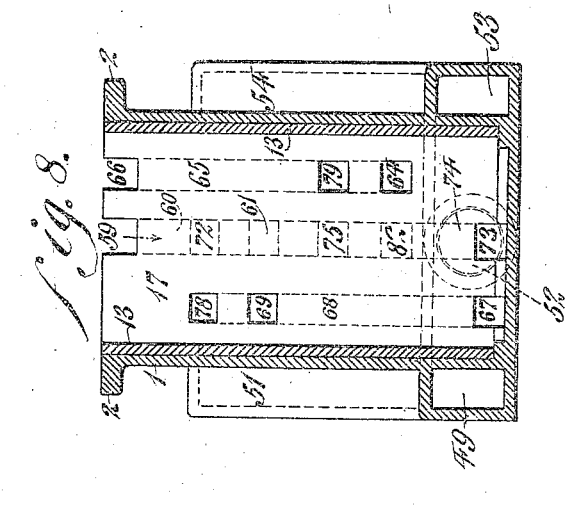
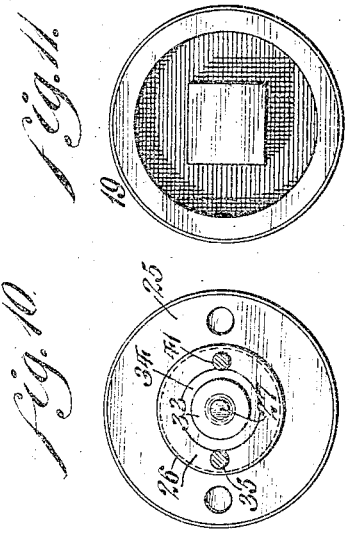
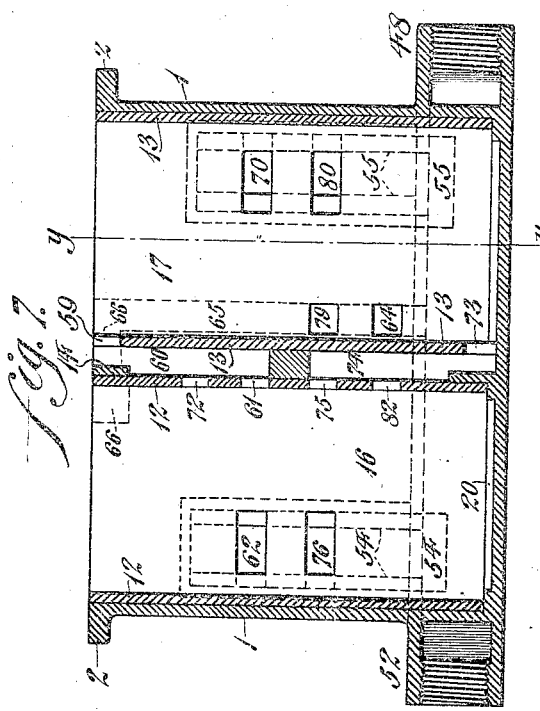
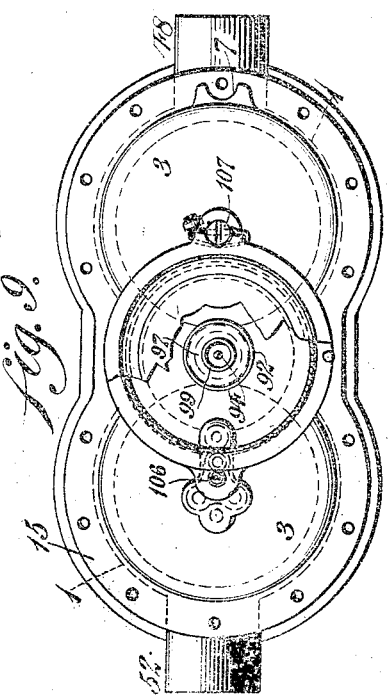
Witnesses
L. Douville,
P. F. Nagle.
Inventor
Walter S. Pollard.
By Niedershew Fairbanks
Attorneys No. 862,584. PATENTED AUG. 6, 1907.
W. S. POLLARD.
WATER METER.
APPLICATION FILED APR. 5, 1906.

5 SHEETS—SHEET 5.

Witnesses
L. Douville
P. F. Nagle

Inventor
Walter S. Pollard
By Wiedersheim Fairbanks
Attorneys

UNITED STATES PATENT OFFICE.

WALTER S. POLLARD, OF PHILADELPHIA, PENNSYLVANIA.

WATER-METER.

No. 862,584.             Specification of Letters Patent.             Patented Aug. 6, 1907.

Application filed April 5, 1906. Serial No. 310,081.

*To all whom it may concern:*

Be it known that I, WALTER S. POLLARD, a citizen of the United States, residing in the city and county of Philadelphia, State of Pennsylvania, have invented a new and useful Water-Meter, of which the following is a specification.

My present invention relates to a fluid meter and consists of a novel and simplified construction of a meter in which balanced pistons are employed and in connection with which novel means are employed for sealing the component parts in order that any improper manipulation of the registering mechanism may be positively prevented.

My invention further consists of a novel construction of a registering piston and novel means co-acting therewith, whereby the flow of water through the meter will be measured in an accurate and reliable manner.

It further consists of a novel construction of a transmission device actuated by the registering piston and adapted to drive the registering mechanism.

It further consists of a novel construction of registering piston which is connected with the transmission mechanism in such a manner that the piston may freely rotate within its respective chamber.

It further consists of novel means for mounting the transmission means co-acting with the registering piston within said piston.

It further consists of a novel construction of hollow pistons having a removable closure in order that the weight of the pistons may be varied by inserting therein any suitable material so that the pistons may be accurately balanced in the fluid which is passing therethrough.

It further consists of a novel construction by means of which the weight of the gear wheels and their adjuncts is removed from the valve stem which is adapted to actuate the registering mechanism.

It further consists of a novel construction of a casing having a plurality of piston chambers therein and a novel construction and arrangement of ports and passages, whereby the fluid passing through the meter actuates the different pistons at a desired time and the fluid is discharged from the chambers formed between the ends of the pistons and the contiguous sides of the piston chambers in such a manner that the meter will accurately register the amount of fluid passing therethrough.

It further consists of a novel construction of cam member adapted to be reciprocated by the registering piston in unison therewith and means co-acting with said cam member whereby the registering mechanism will be accurately driven and the turning of said registering mechanism in a reverse direction positively prevented.

It further consists of a novel means for mounting the cam member forming a part of the transmission mechanism within the registering piston.

It further consists of a novel construction of a stuffing box intermediate the registering mechanism and the piston chamber which positively prevents any of the fluid being measured from passing to the registering mechanism.

It further consists of other novel features of construction, all as will be hereinafter fully set forth.

Figure 13:
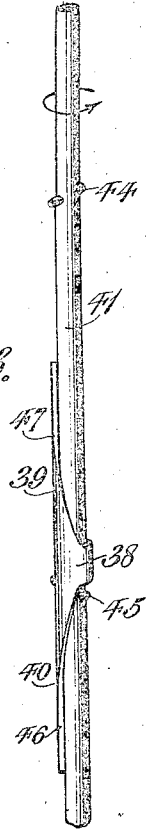
Figure 16:
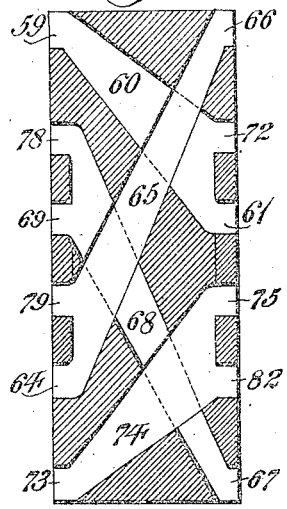
Figure 14:
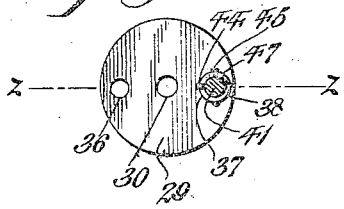
Figure 15:
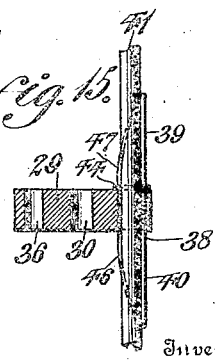

Figure 1 represents a sectional view of a fluid meter embodying my invention. Fig. 2 represents a sectional view similar to Fig. 1 but showing the opposite side of the device. Fig. 3 represents a sectional plan view of the meter on line 3—3 Fig. 1. Fig. 4 represents a sectional view of the meter casing having certain parts thereof removed for clearness of illustration. Fig. 5 represents a sectional view on line $x$—$x$ Fig. 4. Fig. 6 represents a sectional view of one of the pistons employed. Fig. 7 represents a sectional view similar to Fig. 4 but looking in the opposite direction. Fig. 8 represents a sectional view of one of the piston chambers on line $y$—$y$ Fig. 8. Fig. 9 represents a plan view of the device partly broken away for clearness of illustration. Fig. 10 represents a plan view of the closure for the registering piston. Fig. 11 represents a plan view of the closure of the other piston employed. Fig. 12 represents a side elevation of the transmission means coacting with the registering piston and the registering mechanism. Fig. 13 represents a side elevation similar to Fig. 12 but showing the parts in a different relation to each other. Fig. 14 represents a sectional plan view of a disk carried by the registering piston and certain of its adjuncts. Fig. 15 represents a section on line $z$—$z$ Fig. 14. Fig. 16 represents a diagrammatical sectional view showing the manner in which the passages leading from the ports in one piston chamber communicate with the ports in the other piston chamber.

Similar numerals of reference indicate corresponding parts in the figures.

Referring to the drawings. 1 designates a casing having at its upper end an outwardly extending flange 2 adapting the same to receive a suitable cover or closure 3, the improper movement of which is prevented by means of a pin or equivalent device 4, which engages said casing and said cover.

5 designates a bolt or screw passing through the cover 3 and having threaded engagement with the flange 2.

6 designates a bolt or cap-screw, the outer end of which has threaded engagement with the flange 2. The cover 3 has a semicircular recess 7 therein, in order that the head of the bolt 6 will come in close proximity thereto.

8 designates an aperture through the head of the bolt 6, and 9 designates an aperture through the cover 3, there being a suitable sealing device 10 passing through said apertures, whereby the removal of the cover 3 from the casing 1 is positively prevented without first breaking the sealing device 10.

11 designates an upwardly projecting portion of the casing, in order that when the bushings 12 and 13 are inserted, there will be no liability of the fluid employed leaking beneath the bushings.

14 designates a portion of the casing at the upper end which prevents leakage around the bushings in the same manner as already described in connection with the upwardly extending projection 11.

15 designates a flange carried by the cover 3 against which the upper end of the bushings 12 and 13 abut, when the parts are in assembled position, as seen in Figs. 1 and 2, it being noted that the upper ends of the bushings closely engage the cover 3 and form a water tight joint therewith. It will be seen, that by the employment of the two bushings 12 and 13, two piston chambers 16 and 17 are formed.

18 designates a piston, which in the present instance, I have shown as being hollow, in order that the weight of the piston will be substantially the same as the weight of the fluid which is being measured, or in other words, the piston will be equally balanced in the fluid. The piston is provided with a suitable closure or plug 19 by means of which the piston is rendered fluid tight and at the same time the weight of the piston may be varied by inserting any desired material therein, in order to accommodate the same to the fluids which are being measured. This piston 18 has a sliding fit in the bushing 12 and when in its extreme position it abuts against the cover 3 and the flange 15 carried thereby, it being noted that the lower end of the casing 1 is suitably recessed as at 20, to form a fluid chamber when the piston is at the extreme end of its stroke into which fluid may be conducted to move the piston in the opposite direction.

21, 22 and 23 designate annular grooves in the piston 18 thereby forming fluid chambers between the bushing 12 and said piston.

24 designates a registering piston which is substantially hollow and provided with a plug or closure 25, which has threaded or other suitable engagement therewith.

26 designates a sleeve or casing closed at one end and having threaded engagement with the plug or closure 25, the bottom of said sleeve or casing having a suitable aperture therethrough through which passes the rod 27 provided at its lower end with a nut or shoulder 28.

29 designates a guide disk or block having an aperture 30 therethrough, through which the rod 27 passes.

31 designates a tube or sleeve mounted on the rod 27 intermediate the disk 29 and the bottom of the casing 26. 32 designates a tube or sleeve also mounted on the rod 27 and engaging the other side of the disk 29, the sleeves 31 and 32 and the disk 29 being maintained in suitable relation with respect to each other by means of a nut 33 having threaded engagement with the rod 27, and a plate or block 34 interposed between said nut and the end of the sleeve 32.

35 designates a guide rod having threaded or other engagement with the cover 3 and passing through the plate or block 34 and also through an aperture 36 in the disk or block 29.

37 designates an aperture in the block 29 in which is secured in any suitable manner the member 38 having outwardly extending arms or sleeves 39 and 40, said member 38 being suitably apertured in order that it may move freely on the rod 41 on which it is mounted, said rod being journaled at its upper end in a bracket 42 carried in any suitable manner by the cover 3 and also in the cover 3 of the casing if desired, said rod being provided at its upper end with a suitable pinion 43 coacting with the registering mechanism to which I will hereinafter refer.

44 designates a pin or member carried by the rod 41 and extending outwardly therefrom on opposite sides and 45 designates a pin or member carried by the rod 41 near its lower end, it being noted that said pin 45, in the present instance, is located with respect to the rod 41 at substantially right angles with the pin 44, although it will be apparent that the angle which one member forms with respect to the other may be varied according to the conditions and requirements of the case and in the present instance I have shown only two of these pins being employed.

Referring now especially to Figs. 12 and 13, 46 designates a cam face on the lower portion 40 of the member 38. 47 designates a cam face carried on the same side of the extending portion 39 of the member 38, it being understood that the sides of the extending portions 39 and 40 of the member 38 opposite the cam faces 46 and 47 are substantially straight but said members are slightly beveled in order that the center sleeve-like portion of the member 38 may abut against the pins or rods 44 and 45, as clearly indicated in Figs. 12 and 13. 48 designates a fluid inlet which is threaded or otherwise adapted to be suitably connected with a source of fluid supply, there being an inlet passage 49 extending partly around the casing, said passage having leading therefrom the inlet passages 50 and 51, as seen most clearly in Fig. 3. 52 designates the discharge mouth or end of the casing 1 which is threaded or otherwise adapted to be connected with a suitable pipe or conductor, said discharge end 52 communicating with a passage 53 extending partly around the casing which communicates with discharge passages 54 and 55. The registering piston 24 has substantially the same external dimensions as the piston 18 and is provided in a similar manner with annular grooves 56, 57 and 58.

In order to more clearly describe the manner in which the water circulates in the different chambers to actuate the registering mechanism, I will now describe the manner in which the water passes from one piston to the other and from the inlet to the outlet. Having the parts as seen in Figs. 1 and 2, it will be understood that the registering piston is moving upwardly, the fluid above the piston passes through the port 59 through passage 60, port 61, annular groove or chamber 22 in the piston 18, through port 62 into passage 54 and thence through passage 53 to the discharge outlet 52. The registering piston 24 which has now reached the upper part of the chamber 17, remains stationary in the upper part of said cylinder until the piston 18 is moved to the lower part of the chamber 16 in which it is located, it being understood that at this time both the pistons are seated at the upper end of their respective chambers. As the registering piston 24 moves upwardly to its extreme upper position, the motive fluid passes through the inlet 48 to the passage 49 to passage 50 and through port 63 into the piston chamber 17 around the annular groove or chamber 56, through port 64, through passage 65 which is deflected at its upper end and communicates by means of port 66 with the interior of the piston chamber 16, in which is located the piston 18 and acting on the end of this piston moves said piston downwardly to its extreme downward position. As this piston 18 moves downwardly the fluid beneath the piston will discharge through port 67 and into passage 68, which leads to the port 69 opening into the registering piston chamber 17, it being understood that the registering piston is now seated in its uppermost position. The annular groove 57 will register with the port 69 and the fluid will pass therethrough around the annular groove or chamber 57, through port 70 into the passage 55 and thence through passage 53 to the outlet 52. The next operation will be the flow of the fluid to move the registering piston down, it being understood that the piston 18 is now seated in the bottom of its chamber and the registering piston 24 is now seated in the top of its respective chamber. The water entering the inlet 48 passes through passage 49 to passage 51 and thence through port 71 into chamber 16 and around the annular groove 23 which at this time registers with said port 71, thence through port 72 into passage 60, thence through port 59 into the chamber 17 and in rear of the registering piston and forces said piston downwardly to its lowermost position. As the registering piston moves downwardly the fluid beneath the piston passes through port 73 into the passage 74, it being understood that the piston 18 is now seated in its lowermost position, then through port 75 around the annular groove or chamber 22, through port 76 into the passage 54 and thence through passage 53 to the outlet 52. Both the registering and the other piston are now seated in their lowermost positions and the next operation is for the piston 18 to move towards the top of its respective chamber. The motive fluid passes through inlet 48, passage 49 to passage 50 and thence through port 77 into the chamber 17 in which the registering piston is located and since the annular groove 58 now registers with this port the fluid will pass from port 77 around annular chamber 58 in the piston thence through port 78 into passage 68 which communicates, by means of port 67, with the bottom of the piston chamber 16 and passing underneath the piston 18 causes said piston to be moved to its uppermost position. As the piston 18 moves upwardly the motive fluid above the piston will pass through port 66, passage 65 and through port 79 opening into the registering piston and chamber 17 and since the annular groove 57 at this time registers with port 79 the fluid will pass around the groove 57, through port 80 into passage 55 and thence through passage 53 to the main outlet 52. The piston 18 is now in its uppermost position and the registering piston is to be moved to its uppermost position which is caused in the following manner:—The fluid entering the inlet 48 passes through passage 49 and passage 51 through port 81 and since the annular groove 21 at this time registers with said port the fluid will pass around the annular groove 21 through port 82, passage 74, port 73 beneath the registering piston 24 and cause the same to move upwardly to its uppermost position in this piston chamber.

It is to be understood that the registering mechanism is actuated by the registering piston. As the registering piston moves upwardly the disk 29 on which is rotatably mounted the rod 27 will travel upwardly with the piston. The cam face 47 will engage the pin 44 and as it moves upwardly the rod 41 on which the pin 44 is mounted will be rotated one quarter turn. As the registering piston moves downwardly the cam face 46 engages the lower pin 45 and owing to the curvature of the operative cam surface the rod 41 will be rotated another one-quarter turn so that one complete reciprocation of the piston causes the rod 41 to be rotated a half turn. The pins 44 and 45 are so located that the sliding cam member 38 will always contact with either the upper or lower pin or both so that there is no possibility of any improper rotation of the rod 41 taking place and furthermore owing to the construction of the cam faces it will be impossible for the sliding cam member 38 to cause the rod 41 to rotate in the wrong direction, so that if the inlet and outlet were reversed and the water passed through the meter in the opposite direction the water would be accurately measured, it being immaterial if the inlet and outlet are interchanged.

83 designates a plug having engagement with the flange 113, which as seen in Figs. 1 and 2, is deflected to form a chamber in which a gear wheel 84 is mounted, said gear wheel being mounted on a rod or pin 85 through which passes the pin 86, the gear wheel 84 being suitably slotted on its face, in order that the axle or rod 85 on which it is mounted will be fixed in relation thereto, it being noted in Figs. 1 and 2 that in the present instance the lower end of the axis 85 is suitably mounted and has a bearing in the upper end of the closure 83. The casing 3 is apertured at 87 and a closure 88 has threaded or other engagement with said aperture.

89 designates an opening through the closure 88.

90 designates a valve member having in the present instance a beveled seat 91 which is adapted to coact with a corresponding seat in the stuffing box 92. The stuffing box 92 has a chamber 93 therein.

94 designates a valve rod or stem passing through the valve 91 and through the stuffing box 92, said rod or stem 94 carrying at its lower end a rod or pin 95 which is adapted to engage a slot 96 in the axis 85 of the gear wheel 84, whereby said rod 94 is rotated in unison with the gear wheel 84. The weight of the gear wheel 84 and its adjuncts is thereby removed from the valve stem 94, as will be evident.

97 designates a piston head, having an annular groove 98 therein, said head having extending therefrom a sleeve 99 which passes through a closure or cap 100 which has threaded or other engagement with the top of the stuffing box 92.

101 designates a set screw or equivalent device which passes through the sleeve 99 and engages the valve stem 94, whereby the valve stem 94 is fixed relative to the piston 97.

102 designates a pinion or gear mounted in any suitable manner on the sleeve 99. In the present instance the chamber formed between the piston and the bottom of the stuffing box in the chamber 93 is filled with any suitable lubricating material, preferably a substance such as a thick or heavy grease. It will be seen that the stuffing box and its adjuncts are located in a chambered casing 103 provided with a suitable flange 104 on which is adapted to be seated a cap or cover 105 which is secured with respect to said flange by means of screws or equivalent devices 106 and a sealing device 107 which is similar to that already described in connection with the cover 3 and since this feature has been described before I have deemed it unnecessary to further describe the same.

108 designates pins which engage the casing 103 and the body 105, whereby said body 105 cannot be removed without first raising the same above said pins, it being understood that one end of said pins would be fixed either in the flange 104 or in the cap 105. The top of the cap 105 would consist of suitable transparent material such as glass, in order that the registering mechanism (not shown) located in the chamber 109 may be plainly seen, it being understood that any suitable or conventional type of registering mechanism would be employed and this would be connected with and actuated by the pinion 102.

110 designates an idler which in the present instance I have employed intermediate the pinion 43 and the gear wheel 84, although it will be understood that in some instances this idler may be dispensed with according to the conditions and requirements of the case and the result which it is desired to attain.

111 designates an apertured plate secured in any suitable manner to the casing 3 above the chamber 17 and in the present instance I have shown this plate as being held in place by a suitable ring 112. The purpose of this plate is to positively prevent any sticks or foreign material from passing into contact with the gear wheels or the registering mechanism.

It will thus be apparent that there is a continuous flow of fluid through the meter and that owing to the novel construction of transmission device the registering mechanism will always be driven in the same direction, it being immaterial whether the fluid passes from the inlet to the outlet or vice versa. Owing to the novel manner of mounting the valve stem which coacts with the registering mechanism all of the weight of the gears is removed from this valve stem and the relative longitudinal movement of said valve stem with respect to the main gear wheel is permitted.

The passage of the fluid to the registering mechanism is positively prevented by means of the valve 90 mounted on the valve stem 94 and the thick grease or other fluid located in the chamber of the stuffing box. The different pistons may be readily varied by removing the closure therefor and placing within a material of any desired weight in order that the piston will be balanced as desired in the fluid which is being measured.

The different pistons are positively moved and the fluid from the opposite ends of the pistons has a free exhaust to the discharge outlet. Owing to the employment of the bushings 12 and 13 within which the pistons reciprocate the necessity of throwing away the casing when the piston cylinders become worn is obviated, since it is only essential to insert in said casing a new bushing or bushings.

It will be seen that if one fastening member of the cover 3 or the member 105 is loosened or removed, said cap 3 and member 105 cannot be rotated without first raising said member and said cover above the pins 108 and 4, thus positively preventing any improper manipulation of the registering mechanism or its adjuncts.

It will be apparent from the foregoing that I have produced a novel and simplified construction of fluid meter which embodies the advantages enumerated in the statement of invention and the description and while in the present instance I have shown the preferred embodiment thereof, it is to be understood that it is susceptible of modification in various particulars without departing from the spirit and scope of the invention or sacrificing any of its advantages. It will be further apparent that there is no pounding or hammering of the pistons and there is always a constant flow of water through the meter and moreover a full stroke of the pistons is always obtained. Owing to the manner in which the pistons are equally balanced the wear of said pistons in their cylinders is reduced to a minimum with a consequent reduction of fluid leakage. It is further to be noted that in the present instance I have shown each of the piston cylinders as being recessed or chambered at their lower end and that an abutment for the pistons at each end of their stroke is also provided in order that the fluid being measured may always act against the ends of the pistons in an efficient and reliable manner.

Having thus described my invention, what I claim as new and desire to secure by Letters Patent, is:—

1. In a meter, piston cylinders having fluid ports and passages communicating therewith, a piston in each of said cylinders, a cam member carried within one of said pistons, and a rotatable member actuated thereby and adapted to actuate a registering mechanism.

2. In a meter, piston cylinders having fluid ports and passages communicating therewith, a piston in each of said cylinders, each of said pistons having a plurality of annular grooves thereon adapted to register with said ports, a cam member carried within one of said pistons, a member rotated by said cam member, and means driven by said rotatable member adapted to actuate a registering mechanism.

3. In a meter, piston cylinders having ports and passages communicating therewith, a piston in each of said cylinders, each of said pistons having a plurality of annular grooves thereon adapted to control said ports, a cam member non-rotatably carried within one of said pistons, a shaft rotated thereby and adapted to drive a registering mechanism, and means for permitting the rotation of the cam carrying piston.

4. In a meter, a casing having piston cylinders therein, ports and passages communicating with said cylinders, said casing having a removable cover, means for sealing said casing with respect to said cover, a piston in each of said cylinders, each of said pistons having a plurality of annular grooves thereon, a cam member carried within one of said pistons, a shaft, means carried by said shaft coacting with said cam member to actuate said shaft, and means driven by said shaft for actuating a registering mechanism.

5. In a meter, a casing having a removable cover, piston cylinders therein, the latter having ports and passages communicating therewith, means for sealing said casing, a hollow piston in each of said cylinders having a removable top and a plurality of annular grooves at the outer periphery of said pistons, a cam member carried by one of said pistons, means for permitting the rotation of the cam carrying piston means for preventing the rotation of said cam member, a shaft, means carried by said shaft coacting with said cam to actuate said shaft, and means coacting with said shaft to actuate a registering mechanism.

6. In a meter, a plurality of piston cylinders, a piston having a plurality of annular grooves in each of said cylinders, a sleeve removably secured within one of said pistons, a cam member mounted within said sleeve, means for preventing the rotation of said cam member, a shaft extending within said sleeve, means carried by said shaft coacting with said cam member to actuate said shaft, and means carried by said shaft for actuating a registering mechanism.

7. In a meter, a plurality of piston cylinders having ports and passages therebetween, a piston having a plurality of annular grooves in each cylinder and controlling the ports therein, a sleeve within one of said pistons, a cam member non-rotatably mounted within said sleeve, a shaft, means carried thereby coacting with said cam member which on the reciprocation of the cam carrying piston actuates said shaft, and means co-acting with said shaft for driving a registering mechanism.

8. In a meter, a plurality of piston cylinders having ports and passages therebetween, a piston having a plurality of annular grooves in each cylinder and controlling the ports therein, a cam member mounted within one of said pistons, a shaft, means carried by said shaft coacting with said cam member to actuate said shaft, the latter being adapted to drive a registering mechanism, and means for preventing injurious material passing from one end of one of the piston cylinders.

9. In a meter, a plurality of piston cylinders having ports and passages therebetween, a piston having a plurality of annular grooves in each piston cylinder and controlling the ports therein, means for permitting the insertion of material within said pistons to vary the weight thereof, a cam member non-rotatably fixed within one of said pistons intermediate the ends thereof, a shaft passing through said cam member, means on said shaft coacting with said member to rotate said shaft on the reciprocation of said piston, and means for transmitting the movement of said shaft to a registering mechanism.

10. In a meter, a plurality of piston cylinders having ports and passages therebetween, a hollow piston having a removable closure and a plurality of annular grooves in each cylinder and controlling the ports therein, a sleeve within one of said pistons and supported by the closure thereof, a cam member non-rotatably mounted within said sleeve intermediate the ends thereof, a shaft, means mounted thereon and coacting with said cam member whereby said shaft is always rotated in the same direction by said cam member on both the forward and rearward movement of the piston within which it is mounted, and means co-acting with said shaft to actuate a registering mechanism.

11. In a meter, a plurality of piston chambers having ports and passages therebetween, a hollow piston having a removable closure in each of said cylinders, each of said pistons having an annular groove near each end thereof and an annular groove intermediate the ends thereof, said grooves being adapted to register with said cylinder ports, a cam member non-rotatably carried by one of said pistons, a shaft, means carried thereby and coacting with said cam member on both the forward and rearward movement of the cam carrying piston to rotate said shaft, a pinion carried by said shaft, a gear actuated by said pinion, a valve stem actuated by said gear, a valve actuated by said stem, and means operatively connected with said valve stem for actuating a registering mechanism.

12. In a meter, a piston casing, a fluid actuated piston therein, a cam member carried by said piston, a shaft actuated by said cam member on its movement in either direction, a gear having a slotted axis driven by said shaft, a valve stem movably mounted in the slot of said axis, a stuffing box in which said stem has longitudinal movement and provided with a conical valve seat, a valve carried by said stem and engaging said seat, a chamber above said seat, a piston head in said chamber, a sleeve secured to said head and adjustably secured to said valve stem, said sleeve being adapted to drive a registering mechanism.

13. In a meter, a plurality of piston cylinders having ports and passages communicating therewith, a piston having a plurality of grooves in each of said cylinders, a cam member non-rotatably carried within one of said pistons but permitting the rotation of said piston, a shaft means carried by said shaft and coacting with said cam member on the reciprocation of said piston to rotate said shaft, a pinion carried by said shaft, means driven by said pinion for actuating a registering mechanism, and an apertured plate interposed between said pinion and the cam carrying piston.

14. In a meter, a casing having a removable cover, means for sealing said cover, bushings within said casing forming a plurality of piston cylinders, a hollow piston having a removable closure and provided with a plurality of annular grooves in each of said cylinders, there being ports and passages communicating with said cylinders, a sleeve within one of said pistons and carried by the closure therefor, said sleeve having a closed end, a rod passing through said closed end, a support mounted on said rod, means engaging said rod for preventing improper movement of said support, a cam carried by said support, a shaft rotated by said cam on the reciprocation of the piston within which it is mounted, and means actuated by said shaft for driving a registering mechanism.

15. In a meter, a casing, a plurality of piston cylinders having ports and passages communicating therewith, a hollow piston having three annular grooves therein and a removable closure, in each of said cylinders, said pistons controlling the cylinder ports, a support non-rotatably mounted within one of said pistons, a guide rod carried by the casing and extending through said support, a cam member carried by said support, a shaft extending into the cam carrying piston and on which said cam member is movably mounted, and pins carried by said shaft and projecting therefrom on opposite sides thereof, said pins being angularly inclined to each other and coacting with said cam member to rotate said shaft on the reciprocation of the cam carrying piston and said shaft being adapted to impart motion to a registering mechanism.

16. In a meter, a fluid actuated piston a cam carried thereby, a shaft intermittently rotated by said cam, a pinion carried by said shaft, a gear driven by said pinion, a valve stem rotated by said gear and having relative longitudinal movement with respect thereto, a valve carried by said stem, a sleeve to which said stem is secured, and means carried by said sleeve adapted to drive a registering mechanism.

17. In a meter, a casing, a removable cover, a piston adapted to reciprocate within said casing, a shaft extending within said piston and rotated thereby, a gear wheel journaled in said cover to which the motion of said shaft is imparted, a valve stem rotated by said gear wheel and having relative longitudinal movement with respect thereto, means for operatively connecting said stem to a registering mechanism, and means including a flange carried by the cover and a perforated plate for preventing the passage of injurious material from said casing.

18. In a meter, the combination of a casing, hollow reciprocating pistons therein, a cam carried by one of said pistons, said cam carrying piston being free to rotate, a member operatively connected with a registering mechanism, and means carried by said member and coacting with said cam to actuate said member.

19. In a piston meter, the combination of a casing, reciprocating pistons therein, a cam member carried by one of said pistons, and a rotatable member having external contacts thereon between which said cam member reciprocates, said cam member at all times engaging one or the other of said contacts and coacting therewith to actuate said rotatable member.

20. In a piston meter, the combination of a casing, fluid actuated pistons therein, a cam member carried thereby and having arms provided with cam faces, a member operatively connected with a registering mechanism, and contacts thereon with which said cam faces coact to actuate said member.

21. In a meter, the combination of a casing, fluid actuated pistons therein, a cam carried by one of said pistons and provided with a plurality of operative cam faces, a rotatable member on which said cam is non-rotatably mounted, a plurality of contacts on said rotatable member with which said cam faces coact, and a gear mounted on said shaft and operatively connected with a registering mechanism.

22. In a meter, a casing, a cover removably secured thereto, bushings within said casing, a flange depending from said cover and engaging said bushings to form separate fluid chambers, there being ports and passages communicating with said chambers, a gear mounted intermediate said cover and said flange, a stuffing box within said cover and provided with a conical valve seat, a valve stem actuated by said gear and having relative longitudinal movement with respect thereto, a valve having a conical bearing carried by said stem and adapted to engage said seat, means carried by said stem for actuating a registering mechanism, and a fluid actuated piston operatively connected with said gear.

23. In a meter, a casing provided with a plurality of piston chambers having fluid ports and passages therebetween, a piston having a plurality of annular grooves in each of said chambers and controlling the ports therein, each of said pistons having a removable cover, a rod carried by one of said covers, a cam member mounted on said rod, means for preventing the rotation of said cam member, said cam carrying piston being free to rotate, a shaft operatively connected with a registering mechanism, and contacts on said shaft with which said cam co-acts to intermittently rotate said shaft.

24. In a meter, the combination of a casing provided with piston chambers having fluid ports and passages therebetween, a hollow piston provided with a removable end and a plurality of annular grooves in each chamber and controlling the ports therein, a cam member carried within one of said pistons, a shaft adapted to actuate a registering mechanism extending into the cam carrying piston, and a plurality of contacts on said shaft co-acting with said cam member to rotate said shaft, and one of said pistons being maintained in its extreme position during the movement of the other piston.

25. In a meter, a casing a fluid actuated piston therein, a cam member carried thereby, a shaft actuated by said cam member, a gear having a slotted axis driven by said shaft, a valve stem movably mounted in the slot of said axis, a valve carried by said stem, a stuffing box into which said stem extends and having a conical seat therein with which said valve co-acts, there being a chamber above said seat, a piston head in said chamber, a sleeve secured to said head, movably mounted in the top of said stuffing box and extending therethrough, there being lubricating material interposed between said piston head and the bottom of the stuffing box chamber, said stem extending through said head and into said sleeve, a set screw carried by said sleeve and engaging said stem, and a gear carried by said sleeve.

26. In a meter, a casing provided with a piston chamber having ports 59, 78, 69, 79, 64 and 73, a piston chamber having ports 66, 72, 61, 75, 82 and 67, there being passages 60, 65, 68 and 74 between said piston chambers, fluid actuated pistons provided with a plurality of annular grooves in each of said chambers and controlling the ports therein, a cam member carried by one of said pistons, a shaft adapted to actuate a registering mechanism, means thereon co-acting with said cam member, and means including said ports and passages for conveying fluid to and from said piston chambers.

27. In a meter, a casing provided with a plurality of piston chambers having ports and passages therebetween, hollow pistons provided with a plurality of annular grooves controlling the ports therein, one of said pistons having a removable cover, a casing having engagement with said cover, a guide rod extending into said casing, a cam block through which said rod extends, a rod on which said cam block is loosely mounted, a member intermediate said cam block and the closed end of said piston casing, a block mounted on said last named rod, a member intermediate said block and said cam block, nuts engaging said last named rod to maintain said cam block in fixed relation with respect to said casing, a cam member having a plurality of operative cam faces carried by said cam block, a shaft adapted to actuate a registering mechanism extending within said casing, and a plurality of contacts carried by said shaft with which said cam faces co-act.

28. In a meter, piston cylinders having fluid ports and passages communicating therewith, a piston in each of said cylinders, a cam carried by one of said pistons, the cam carrying piston being free to rotate, and a member actuated by said cam member and adapted to control a registering mechanism.

29. In a meter, piston cylinders having fluid ports and passages communicating therewith, a piston in each of said cylinders, each of said pistons having a plurality of annular grooves therein adapted to register with said ports, a cam member carried by one of said pistons, and means cooperating with said cam member to actuate a registering mechanism, the cam carrying piston being free to rotate.

30. In a meter, piston cylinders having fluid ports and passages communicating therewith, a piston in each of said cylinders, a cam member non-rotatably carried by one of said pistons, and reciprocated thereby, said cam carrying piston being free to rotate, and means co-acting with said cam to actuate a registering mechanism.

31. In a meter, piston cylinders having fluid ports and passages communicating therewith, a piston in each of said cylinders, each of said pistons having a plurality of annular grooves therein adapted to register with said ports, a cam non-rotatably carried by one of said pistons, a shaft actuated thereby on both the to and fro movement of said piston, said cam carrying piston being free to rotate, and means co-acting with said shaft to actuate a registering mechanism.

WALTER S. POLLARD.

Witnesses:
JOHN A. WEIDERSHEIM,
HERBERT S. FAIRBANKS.